R. O. DUTCHER.
EMERGENCY TIRE.
APPLICATION FILED JUNE 10, 1920.
1,371,150.
Patented Mar. 8, 1921.
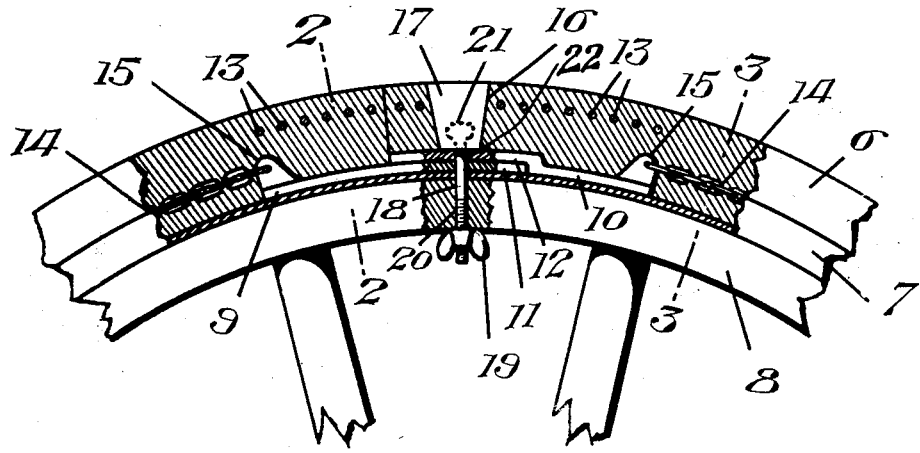
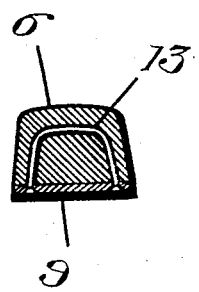
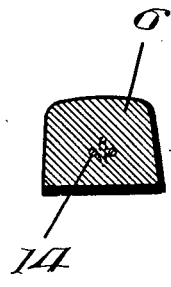
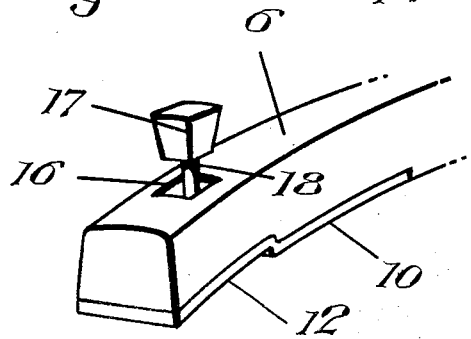
Inventor
R. O. DUTCHER
By W. J. Fitzgerald
Attorney
Witness

UNITED STATES PATENT OFFICE.

ROBERT O. DUTCHER, OF MOROCCO, INDIANA, ASSIGNOR OF FORTY PER CENT. TO VERNON RUSSELL, OF MOROCCO, INDIANA.

EMERGENCY-TIRE.

1,371,150.                    Specification of Letters Patent.          Patented Mar. 8, 1921.

Application filed June 10, 1920. Serial No. 387,860.

*To all whom it may concern:*

Be it known that I, ROBERT O. DUTCHER, a citizen of the United States, residing at Morocco, in the county of Newton and State of Indiana, have invented certain new and useful Improvements in Emergency-Tires; and I do hereby declare the following to be a full, clear, and exact description of the invention, such as will enable others skilled in the art to which it appertains to make and use the same.

The present invention relates to an emergency tire, and aims to provide a novel and improved tire of that kind which can substitute the ordinary pneumatic tire when punctured or ruptured, in order that the motor vehicle can proceed on its way without stopping for repairs or purchasing a new tire on the road.

It is the object of the invention to provide an emergency tire having novel and improved means for connecting the ends thereof when wrapped around the felly or rim of the wheel, and novel means for securing said ends to the felly.

A further object is to reinforce and strengthen the end portions of the tire, and to also reinforce and strengthen the tire throughout its length to hold it in place on the wheel.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a fragmentary elevation of a wheel showing the tire thereon, with portions in section to illustrate the adjacent end portions of the tire.

Figs. 2 and 3 are cross sections of the tire on the lines 2—2 and 3—3, respectively, of Fig. 1.

Fig. 4 is a perspective view of one end portion of the tire showing the fastening bolt partially removed.

The emergency tire 6 is constructed of rubber, composition or other suitable material, which preferably is resilient, and is of a suitable length to pass around the rim 7 of the wheel felly 8, the tire being furnished in various sizes for different wheels. Metal plates 9 and 10 are secured to the end portions of the tire at and flush with the inner periphery thereof, and the plate 9 projects beyond the corresponding end of the tire to provide a tongue 11, while the plate 10 is offset outwardly, as at 12, to overlap the tongue 11. The plates thus overlap when the tire is placed on the wheel with the ends of the tire abutting. In order to firmly secure said plates to the end portions of the tire, transverse outwardly-projecting arches 13 of wire or other suitable material have their terminals anchored to the plates, and said arches are embedded in a longitudinal series in the end portions of the tire, thereby firmly holding the plates and end portions of the tire together, and reinforcing said end portions of the tire.

The tire is also reinforced throughout its length from one end portion to the other, by means of a chain 14 or similar flexible element embedded within the tire longitudinally thereof, and having its ends anchored to the opposite ends of the plates 9 and 10 which have ears 15 or similar means to which said chain is connected. The chain 14 will prevent the tire from stretching, and will therefore hold it tightly on the wheel.

In order to secure the end portions of the tire together on the wheel, that end portion to which the plate 10 is secured, has an inwardly-tapered angular hole 16 leading from the outer periphery of the tire to the offset portion 12, for receiving the similarly-shaped head 17 of a securing bolt 18, which is inserted inwardly through apertures 22 in the portion 12 and tongue 11, and through the valve stem hole or aperture 20 in the felly 8. A wing nut 19, or the like, is then screw threaded on the bolt to bear against the inner periphery of the felly 8, whereby to clamp the plates 9 and 10 against the rim 7, and said bolt will also prevent said plates from separating. The head 17 can be of rubber or material similar to the tire 6, molded on a knob 21 on the shank of the bolt, so as to yield with the tire.

In the event that the pneumatic tire becomes punctured or ruptured, it can be readily taken off and the emergency tire substituted, it only being necessary to wrap the emergency tire around the wheel and then insert the bolt 18 and fasten same by the nut 19. This will eliminate the necessity for stopping to repair the injured pneumatic tire or to purchase a new one while on the road.

Having thus described the invention, what is claimed as new is:—

1. An emergency tire adapted to be wrapped around a wheel having plates at the end portions thereof at the inner periphery having outwardly-projecting portions embedded in said end portions, one plate extending beyond the corresponding end of the tire, to provide a tongue, the other plate being offset to fit over said tongue, and means for securing said tongue and offset portion together and fastening them to the felly of a wheel.

2. An emergency tire adapted to be wrapped around a wheel and having plates secured to the end portions thereof and adapted to overlap, one end portion having a hole extending to the corresponding plate, and a bolt insertible through said plates and having a resilient head to fit within said hole.

3. An emergency tire adapted to be wrapped around a wheel, plates for the end portions of the tire at the inner periphery thereof, and adapted to overlap, members carried by said plates embedded in the end portions of said tire, and means for securing the end plates together.

4. An emergency tire adapted to be wrapped around a wheel, plates for the end portions of the tire, arches secured to said plates and embedded in the end portions of the tire, and means for securing said plates together.

5. An emergency tire adapted to be wrapped around a wheel, plates for the end portions of the tire at the inner periphery thereof having outwardly-projecting portions embedded in said end portions, a flexible element embedded in the tire longitudinally thereof and having its ends anchored to said plates, and means for attaching said plates together.

In testimony whereof I have signed my name to this specification in the presence of two subscribing witnesses.

ROBERT O. DUTCHER.

Witnesses:
O. M. TUGGLE,
J. C. MURPHEY.